United States Patent
Chen et al.

(10) Patent No.: US 7,375,863 B2
(45) Date of Patent: *May 20, 2008

(54) IMAGE READING DEVICE ACTIVATED BY LIGHT INTERFERENCE

(75) Inventors: Hsi-Min Chen, Hsin-Chu (TW); Jung-Chou Lin, Hsin-Chu (TW); Te-Chih Chang, Hsin-Chu (TW)

(73) Assignee: Transpacific Optics LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/317,777

(22) Filed: Dec. 23, 2005

(65) Prior Publication Data

US 2006/0158697 A1 Jul. 20, 2006

Related U.S. Application Data

(63) Continuation of application No. 09/962,099, filed on Sep. 26, 2001, now Pat. No. 7,031,030.

(30) Foreign Application Priority Data

Oct. 30, 2000 (TW) .............................. 89218772 U

(51) Int. Cl.
*H04N 1/04* (2006.01)

(52) U.S. Cl. .................. 358/474; 358/496; 358/497; 358/498

(58) Field of Classification Search ................ 358/474, 358/496, 497, 498; 382/312, 313, 314, 315; 250/208.1, 206.1

See application file for complete search history.

(56) References Cited

U.S. PATENT DOCUMENTS

| 4,849,821 | A | * | 7/1989 | Allen et al. | 358/405 |
| 5,057,936 | A | * | 10/1991 | Bares | 358/405 |
| 5,568,281 | A | * | 10/1996 | Kochis et al. | 358/475 |
| 6,298,175 | B1 | * | 10/2001 | Longacre et al. | 382/312 |

* cited by examiner

*Primary Examiner*—Houshang Safaipour
(74) *Attorney, Agent, or Firm*—Perkins Coie LLP

(57) ABSTRACT

An image reading device is activated by the light interference of a light path. The image reading device comprises at least an image sensing element, a picture and an image changing mechanism such as a picture conveying module, picture rotating module, a hole or a soft button with a picture in the inner side. The user may use a finger or other objects to interfere with the image generated in the image sensing element. By detecting the changes of the image, a predetermined activation process of the image reading device is therefore started.

20 Claims, 8 Drawing Sheets

IMAGE READING DEVICE ACTIVATED BY LIGHT INTERFERENCE

This is a Continuation Patent Application of U.S. patent application Ser. No. 09/962,099, filed on Sep. 26, 2001 now U.S. Pat. No. 7,031,030, titled "Image Reading Device Activated by Light Interference", assigned to the assignee of the presently claimed subject matter.

BACKGROUND OF THE INVENTION

1. Field of the Invention

The present invention generally relates to an apparatus for reading images, wherein the apparatus is activated by a moving image of an object.

2. Background Description

Nowadays the image reading apparatus is fully employed in many fields. Most of the operators or users would like to use the image reading apparatus, such as a scanner, as easily as possible. It would be the best choice if there is no need to activate the application software first before processing the scan.

The prior known scanner is therefore a button for the purpose of activating the scanner. Once the user pushes the button, the scanner will conduct the scan. Please refer to FIG. 1. It shows the image reading apparatus 1 has a body 10, a button 11, a button base 12, a circuit board 13, a cable 14, scanning module 15, a driving module 16 and a flatbed 17. The scanning module 15 further comprises a light source 151, an image sensor 152, a mirror 153 and a focusing lens 154. The image sensor 152 may be a CCD (Charge-Coupled Device) or a CIS (Contact Image Sensor). When the user pushes the button, a signal will be generated to activate a preset operation, such as a direct activation of the application program. Meanwhile, the light source 151 will provide a light to the document placed on the flatbed via the mirror 153 and focusing lens 154, and therefore an image be produced on the image sensor. After the image sensor outputs analog signals, the driving module will forward the scanning module to the direction of the arrow in order to complete the scan.

As seen in the above, each element, including button 11, button base 12 and cable 14, is needed. In this case, the cost of a prior-known scanner cannot be reduced.

Nonetheless, the present invention provides an image reading device especially activated by a switching mechanism to interfere with the image of a predetermined picture, or to move the image of a predetermined picture, or to conceal the route of light of the image of a predetermined picture. In this case, once an image sensing element detects the activation, a direct launch of the application software will be started.

SUMMARY OF THE INVENTION

It is therefore an object of the present invention to provide an apparatus for reading an image activated by a image switch mechanism, moving images or a light bypass hole. The prior known button, button base or cable are not necessary anymore. Thus, the cost of the image reading apparatus would be reduced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
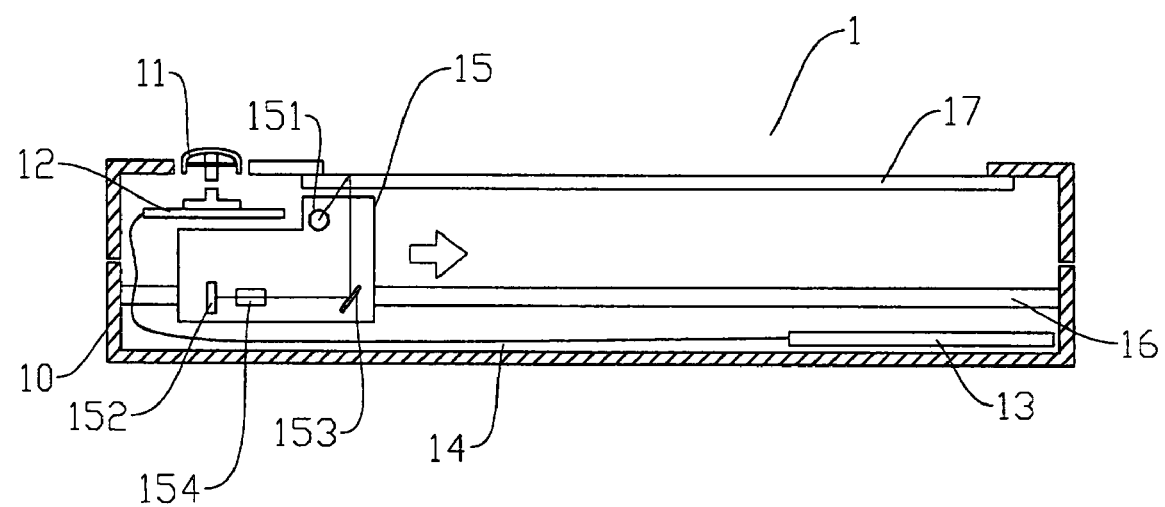
FIG. 1 is a schematic demonstration of the cross section of the prior image reading device.
Figure 2:
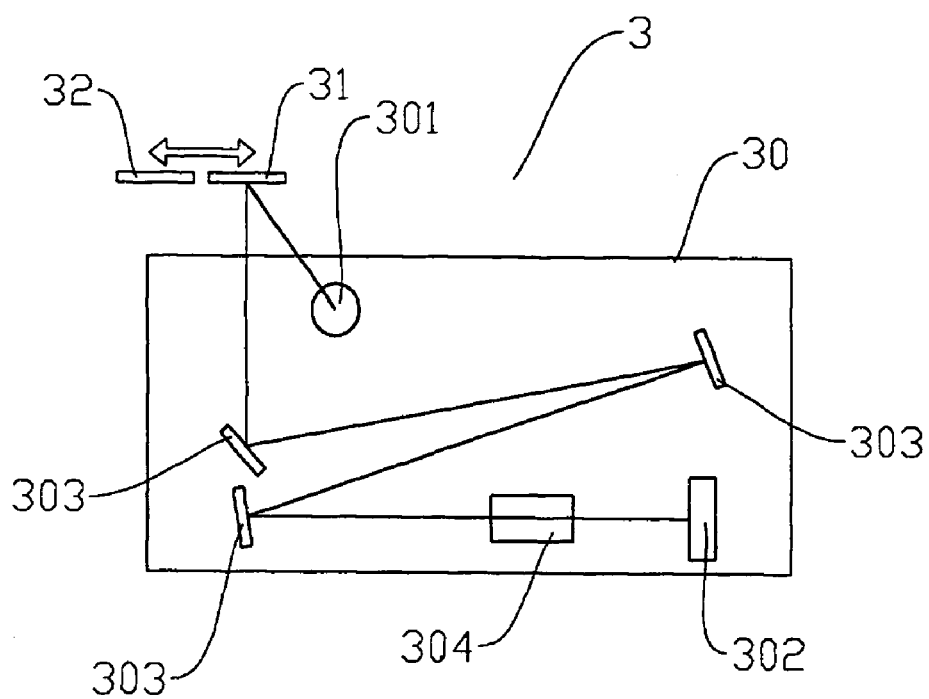
FIG. 2 demonstrates the first embodiment of the present invention activated by a image switch mechanism.

FIG. 2 shows the first embodiment of the present invention. The image reading device 3 includes at least a scanning module 30, a first picture 31, a second picture 32 and a switch mechanism (not shown). The scanning module 30 has a light source 301, an image sensing element 302, a mirror 303 and a focusing lens 304. The switch mechanism enable the first picture 31 and the second picture 32 movable horizontally or in parallel to the image reading device 3. The user may move the switch mechanism to convey the first picture 31 and the second picture 32 in parallel.

When the image reading device 3 is on stand-by mode, the scanning module 30 is placed in a predetermined position. The light source 301 propagates light to the first picture 31. The image of first picture 31 will be generated eventually on the image sensing element 302 via the help of the mirror 303 and focusing lens 304. The image sensing element 302 is capable of generating a first analog image signal following the image. If the user conveys the second picture 32 to the light route of the light source 30, the image sensing element 302 therefore detects the image of the second picture 32 and generates a second analog image signal. Since the difference among the first analog image signal 310 and the second analog image signal 320, the detection result will activate a predetermined function or start of predetermined application software.

Figure 4A:
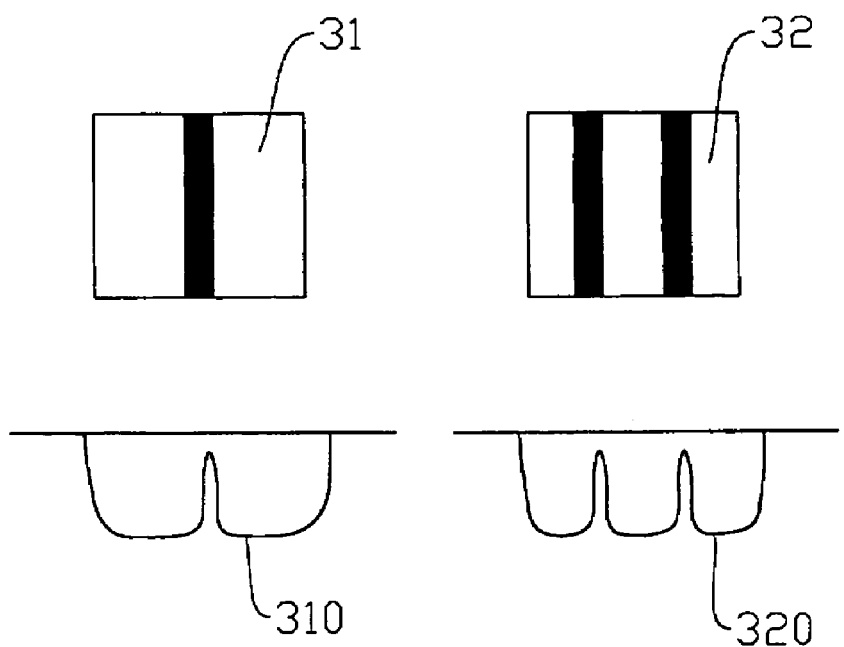
FIG. 4A shows image signals of the first embodiment of the present invention.

The first picture 31 may contain a single line and the second picture 32 may contain double line, as shown in FIG. 4A. In this case, the output image signals will be different as shown in FIG. 4A for the purpose of detection.

Figure 4B:
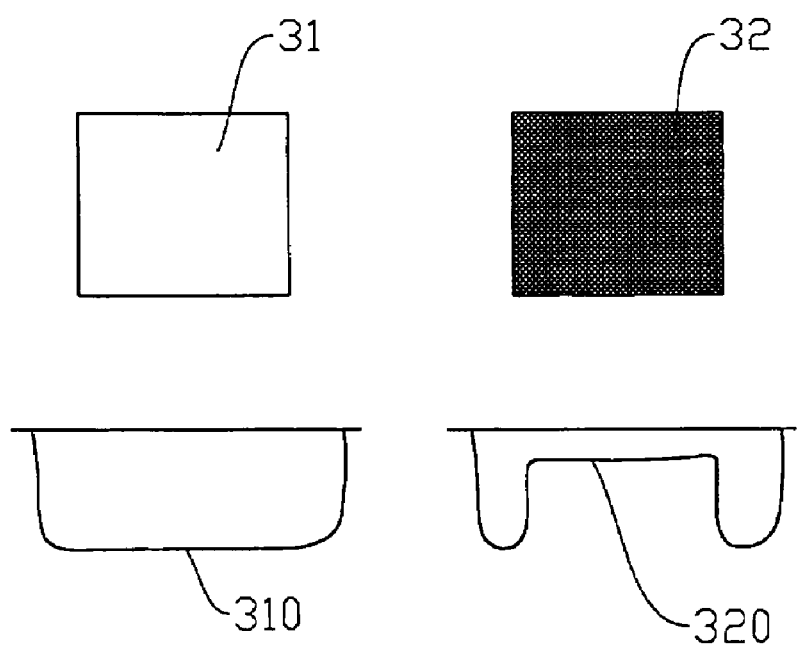
FIG. 4B shows another type of the image signal of the first embodiment of the present invention.

The image sensing element 302 may be a CCD (Charge-Coupled Device) or CIS (Contact Image Sensor). The first picture 31 and the second picture 32 may also be composed of different colors. As shown in FIG. 4B, the first picture 31 is simply white color. The second picture 32 is simply black color. Since the generated image signals of black color and white color are quite different, the detection result will activate a predetermined application software. Of course, the colors of the first picture and the second picture may be other colors rather than only black arid white. Any colors may cause the differences between the images of the first picture and the second picture, and may also be utilized.

Figure 3:
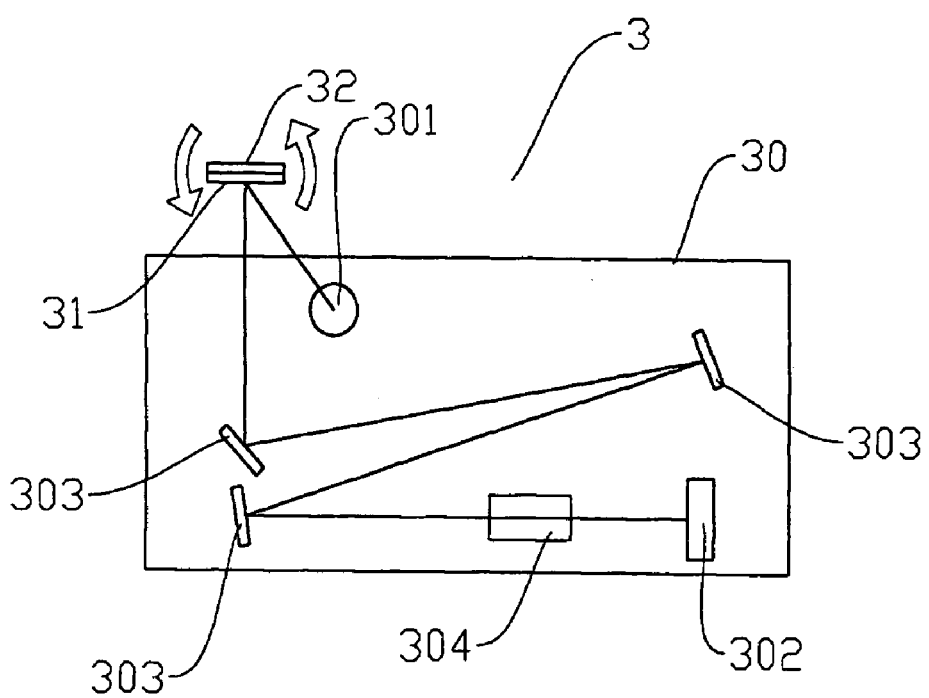
FIG. 3 shows the second embodiment of the present invention activated by rotation of the image switch mechanism.

FIG. 3 shows the second embodiment of the present invention. The first picture 31 and the second picture 32 are placed opposite and face opposite directions. When the user pushes, clicks or rotates a switch mechanism (not shown in figures), the first picture 31 and the second picture 32 will rotate. The action may cause the detection of differences between the images from the first picture 31 to the second picture 32, or from the second picture 32 to the first picture 31. Since the image sensing element 302 detects the differences, a predetermined application software or function will be activated to conduct the scan.

Figure 5:
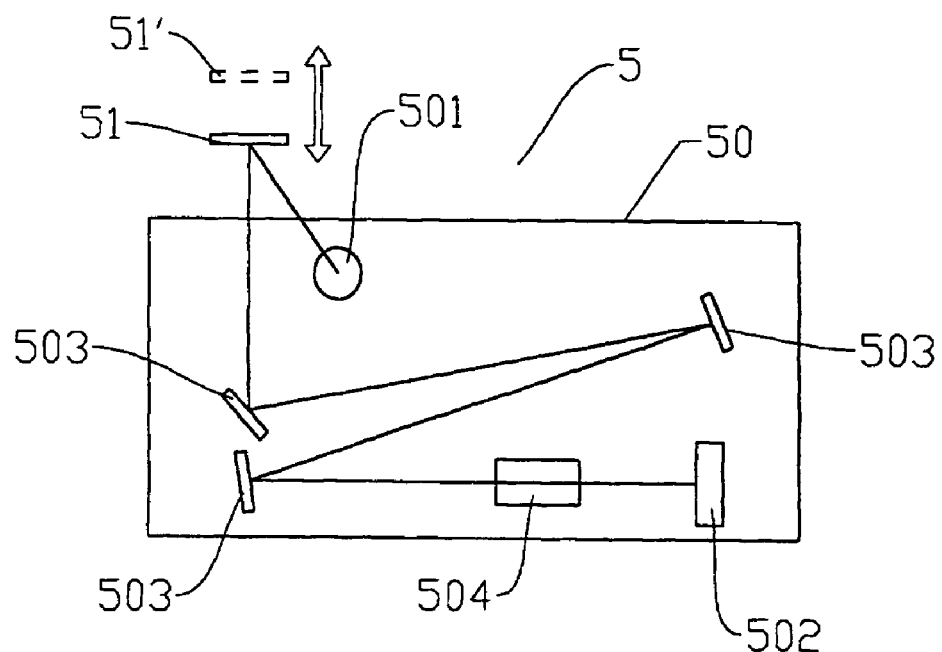
FIG. 5 is the cross section view of the third embodiment of the present invention.

The third embodiment is shown in FIG. 5. The image reading device 5 comprises at least a scanning module 50, a picture 51 and a moving mechanism (not shown). The moving mechanism is capable of moving the picture 51 along the direction of the incident light.

When the image reading device 5 is on stand-by mode, the scanning module 50 is placed in a predetermined position. The light source 501 propagates light to the picture 51. The image of the picture 51 will be generated eventually on the image sensing element 502 via the help of the mirror 503 and focusing lens 504. The image sensing element 502 is capable to generate a first analog image signal following the image of the picture 51. If the user convey the picture 51 upwardly at the position 51', the image of the picture 51 will cause a second analog image signal since the picture 51 is at a different height. Since the difference among the first analog image signal 510 and the second analog image signal 511 is detected, the detection result will activate a predetermined function or start of predetermined application software.

Figure 6:
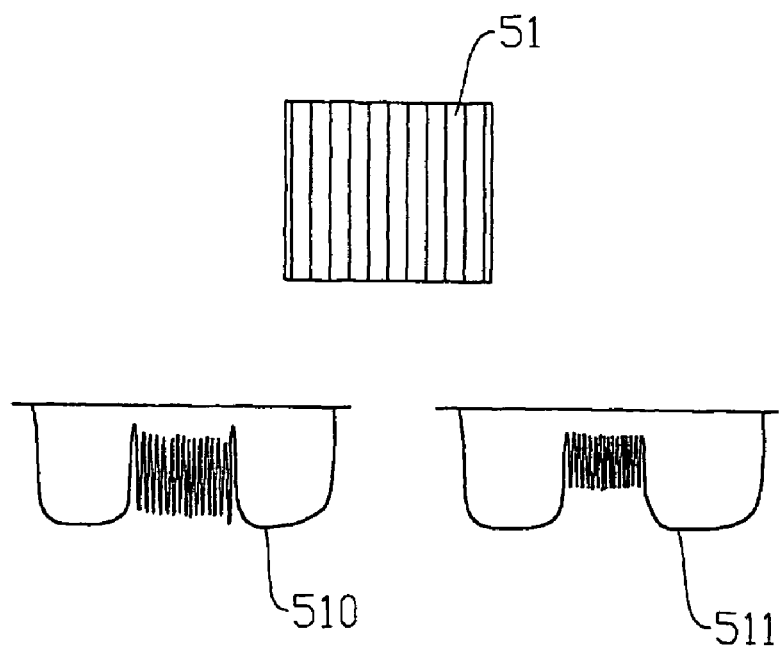
FIG. 6 shows the image signals of the third embodiment.

The picture 51 may contain a plurality of parallel lines as shown in FIG. 6. In this case, the output image signals will be different as shown in FIG. 6 for the purpose of detection.

The detection of the difference of the image signals is according to the clarity of the image. The clarity of the image of the picture can be presented by a parameter names as MTF (Modulation Transfer Function).

Figure 7:
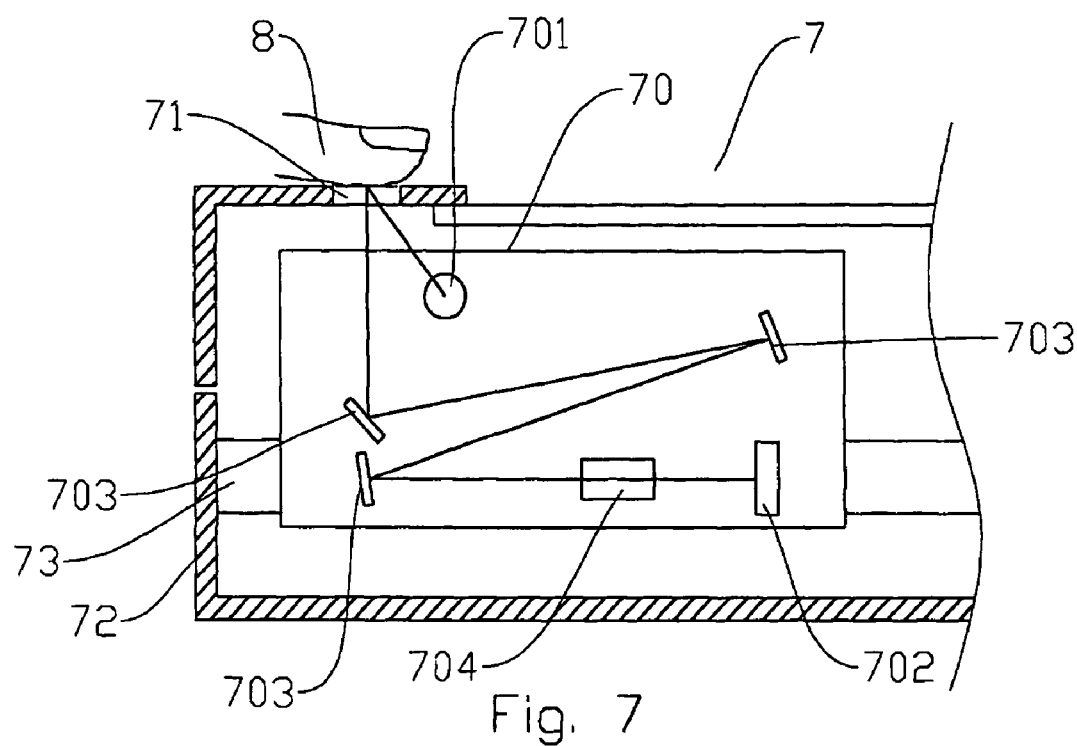
FIG. 7 is the cross section view of the fourth embodiment of the present invention.

FIG. 7 shows the fourth embodiment of the present invention. The image reading device 7 has at least a scanning module 70 and holes 71. The holes are formed on the body 72 of the image reading device 7.

When the image reading device 7 is on the stand-by mode, the scanning module 70 is placed in a predetermined position. The light source 701 propagates light through the hole 71. At this time, the image sensing element 702 only detects the ambient light and therefore generates a first analog image signal. When the user put fingers to conceal the hole, the ambient light will be stopped and the light from the light source 701 will be reflected to the image sensing element 702 via the light path through mirror 703 and the focusing lens 704. In this case, the image sensing element 702 generates a second analog image signal. Actually, the user may employ other objects to stop the ambient light and reflect the light from the light source. Since the strength of the ambient light and the light from the light source, there is a difference occurred among the first analog image signal and the second analog image signal. The detection result would activate a predetermined application program or predetermined functions.

Figure 8:
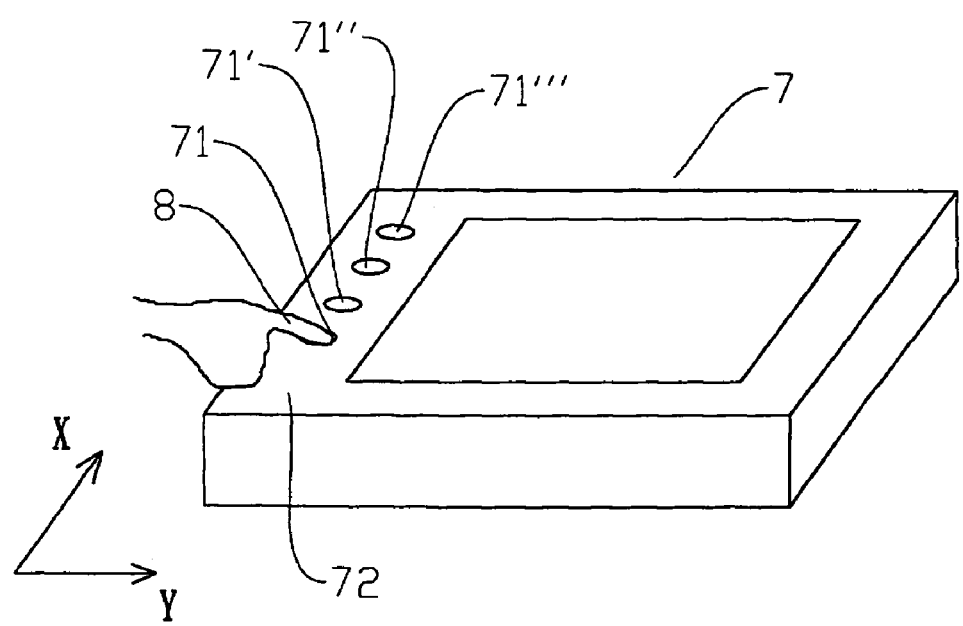
FIG. 8 is the perspective view of the fourth embodiment.

As discussed in the above, there may be utilized a plurality of holes as shown in FIG. 8, such as holes 71, 71', 71" and so on. Each hole can represent different functions such as facsimile, copy, scan or print.

Figure 9:
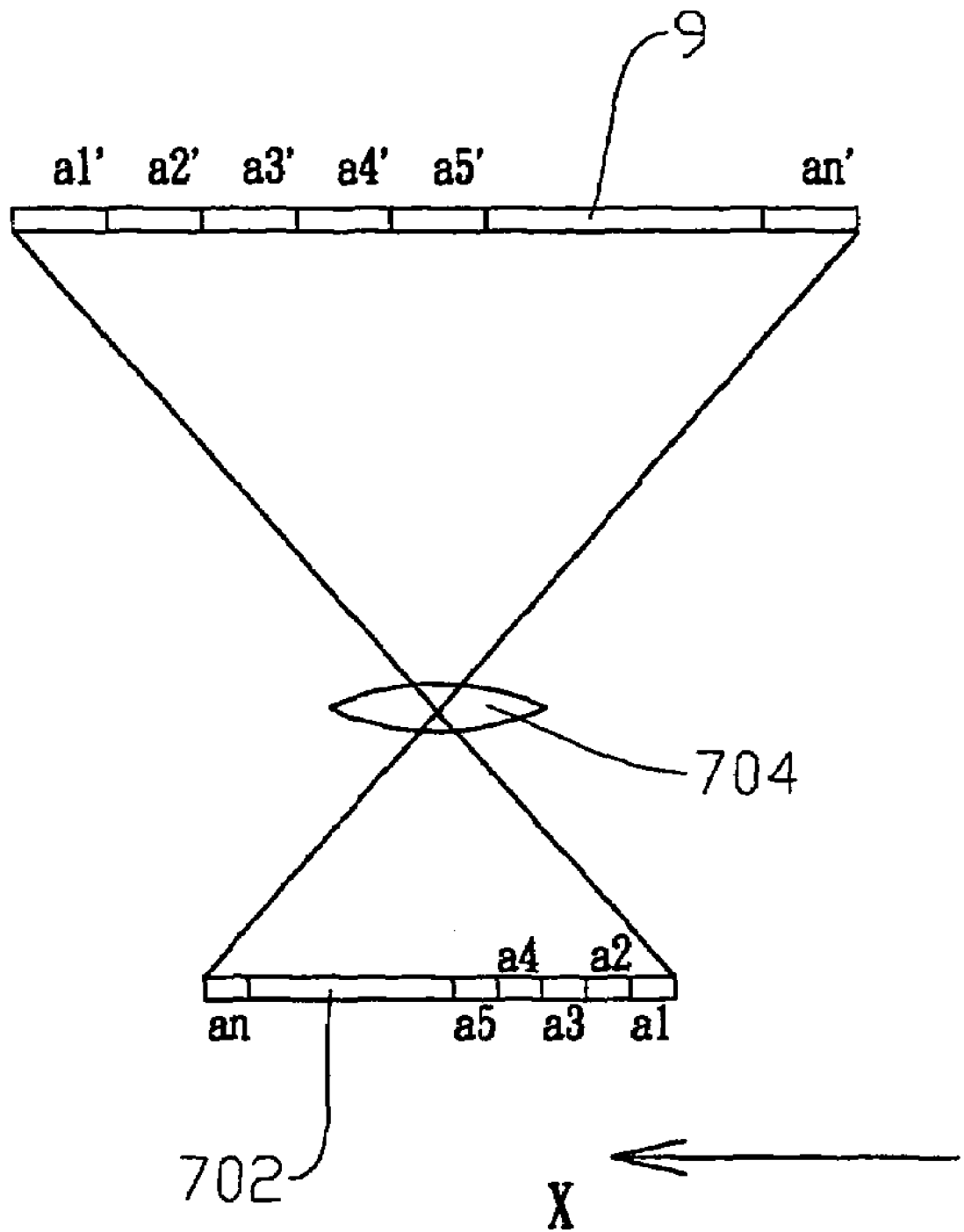
FIG. 9 shows the function of the image sensing element.

FIG. 9 shows the details of the fourth embodiment of the present invention. The image sensing element 702. may be divided into several segments such as a1, a2, a3, a4 and so on. A presumed object to be scanned may also include corresponding segments such as a1', a2', a3', a4' and so on. If each hole is set on the body 72 along the segments along the X direction shown in FIG. 8, a different function for each hole may be defined. For example, hole 71 may be set between the segments a1' to a50' (not shown). Hole 71' may be set between the segments a100' (not shown) to a150' (not shown). When the user puts a finger the hole 71, the segment a1to a50 of the image sensing element 702 will detect an image change and therefore generate different image signals. In this case, if the hole 71 is defined previously as activation of scanning processes, the image reading device 7 will start to scan.

The fifth embodiment of the present invention is shown in FIG. 10. The hole my be replaced as a soft button 90. The inner side of the soft button 90 contains a picture for generating a significant image signal as the further discussion.

Figure 10A:
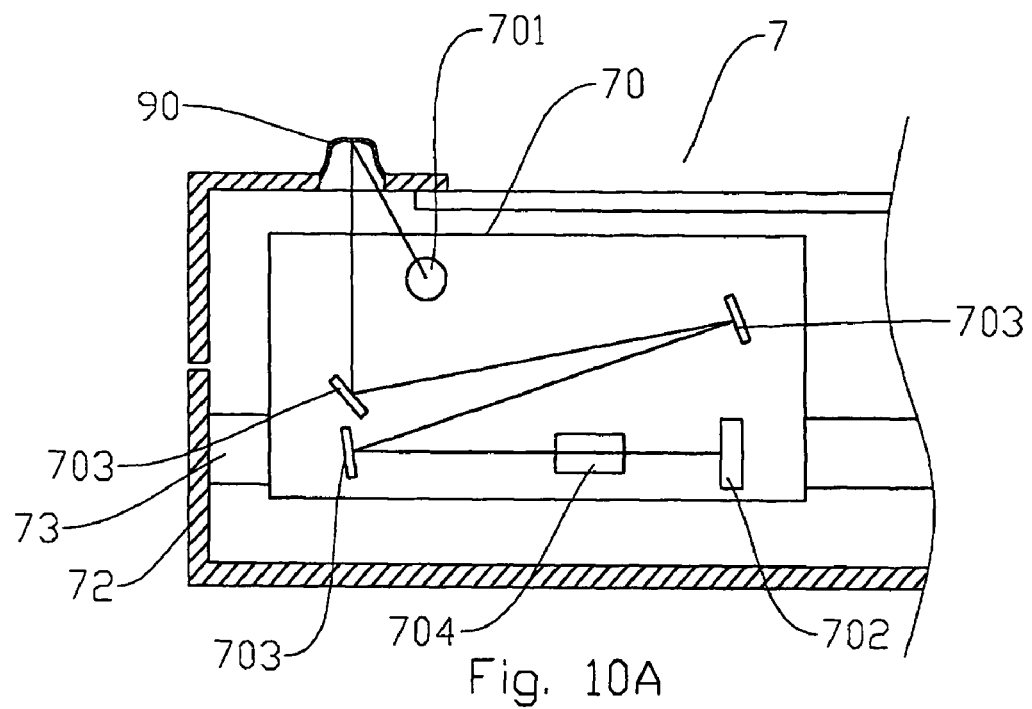
FIG. 10A is the cross section view of the fifth embodiment of the present invention.
Figure 10B:
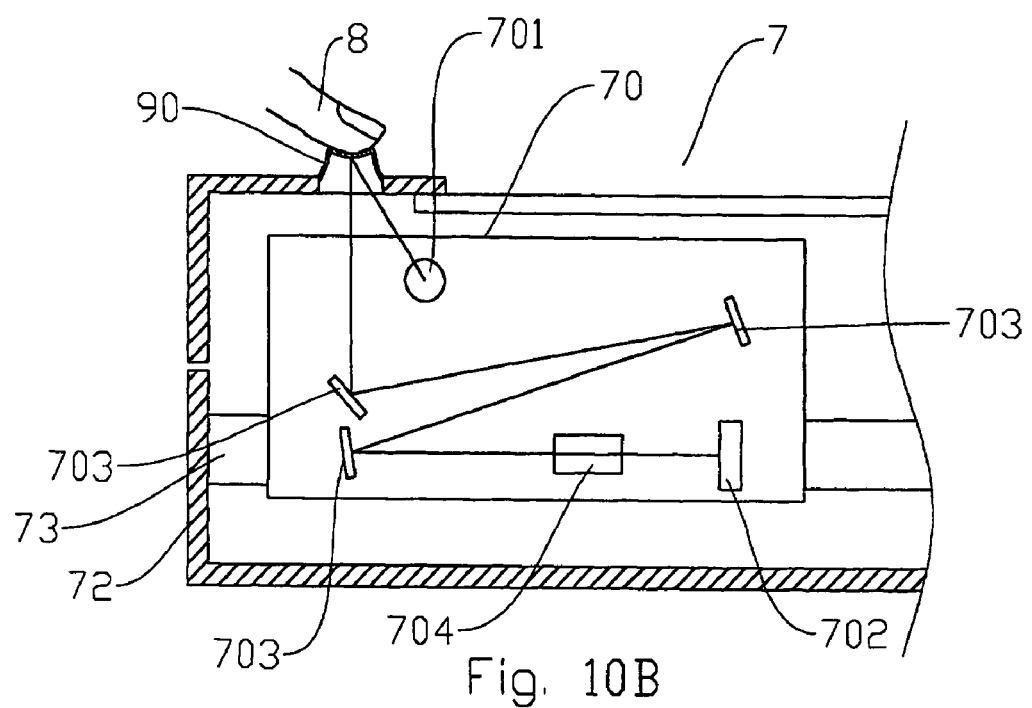
FIG. 10B shows the soft button being pushed down.
Figure 11:
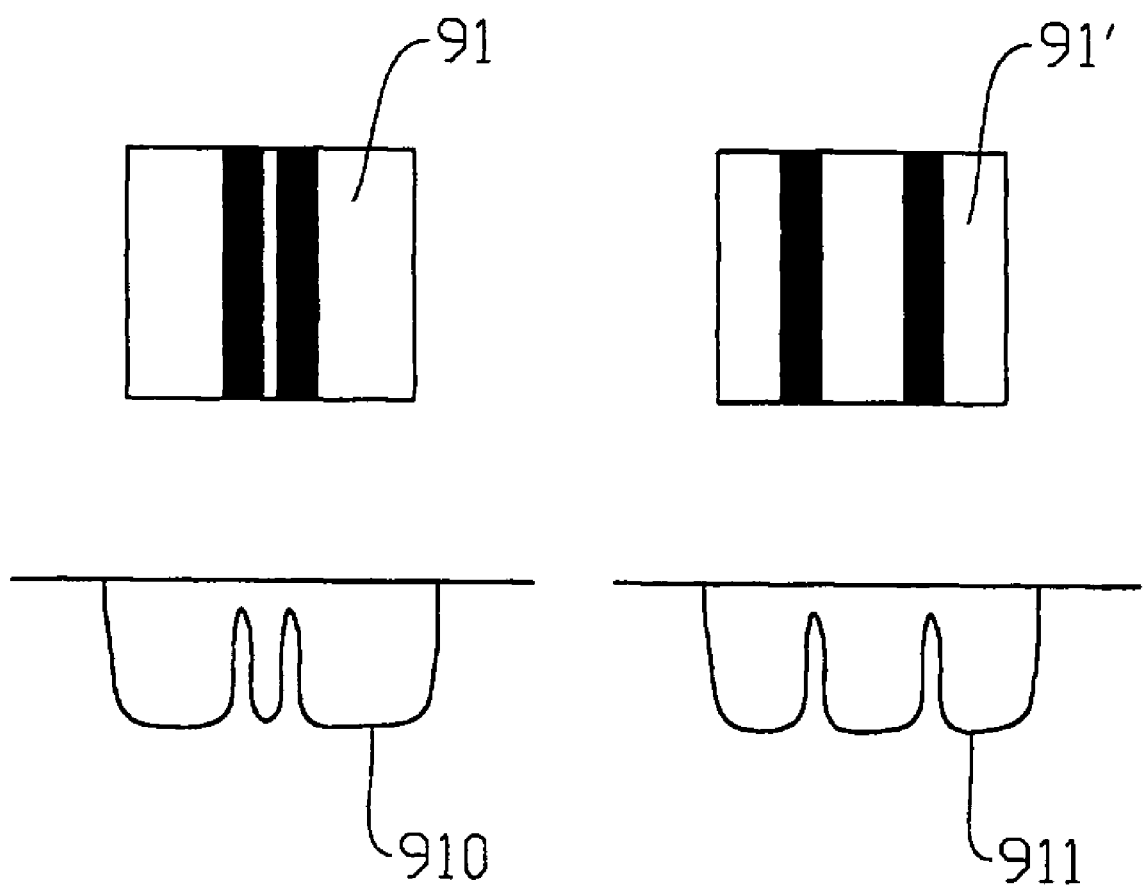
FIG. 11 shows the image signals of the fifth embodiment.

Please refer to FIGS. 10A, 10B and 11. When the image reading device 7 is on the stand-by mode, the scanning module 70 is placed in a predetermined position by help of a driving module 73. The light source 701 propagates light to the inner side of the soft button 90 with a picture 91. When the light is reflected by the picture, a first analog image signal 910 is generated by the image sensing element 702. When the user push the soft button 90, the picture 91 will be distorted. Therefore a second analog image signal 911 is generated following the distorted picture. Based upon the difference of the first analog image signal and the second analog image signal, a predetermined activation process may be activated.

In view of the above embodiments, the present invention provides activation mechanisms by moving, rotating or distorting the pictures, or stopping, concealing the ambient light, or reflecting the light from the light source by helps of fingers or other objects to change the image signals. Once the difference of the image signals is detected, a predetermined activation process is therefore started. In this regard, a light and lower cost of an image reading device is provided. Further, the simple assembling process also increase the quality of the image reading device.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. A method, comprising:
   selectively moving a first picture or a second picture into a light route of a scanner;
   detecting a first image signal of the first picture and a second image signal of the second picture disposed in the light route, wherein the first picture is different than the second picture;
   determining a difference between the first image signal and the second image signal; and
   activating a scanning function to scan an object in response to the detected difference.

2. The method of claim 1, further comprising:
   determining one or more properties of the first picture and the second picture; and activating the scanning function based at least in part on the one or more determined properties.

3. The method of claim 1, wherein the object comprises a document.

4. The method of claim 1, wherein the object comprises a picture.

5. The method of claim 1, wherein the light route comprises a light path of a light source.

6. The method of claim 1, wherein selectively moving the first and second pictures into the light route includes moving the first picture into a first position in the light route, and moving the second picture into a first position.

7. The method of claim 6 wherein detecting the image signal includes detecting the image signal of the first picture in response to moving the first picture into the light path, and detecting the image signal of the second picture in response to moving of the second picture into the light path.

8. An image reading device, comprising:
a light source having a light route and an image sensing element, wherein the image reading device is configured to
detect a first image signal of a first image with the image sensing element in response to selectively moving the first image to a forst position in the light route;
detect a second image signal of a second image with the sensing element in response to selectively moving the second image to the first position in the light route; and
scan an object in response to a detected difference between the first image signal and the second image signal.

9. The image reading device of claim 8, wherein the image reading device further comprises a moving mechanism configured to move the first image and the second image into the first position.

10. The image reading device of claim 9, wherein the moving mechanism is activated in response to a switch.

11. The image reading device of claim 8, wherein the image reading device is further configured to:
determine one or more properties of the first image and the second image; and
scan the object at least partly in response to the one or more determined properties.

12. The image reading device of claim 8, wherein the object comprises a document.

13. The image reading device of claim 8, wherein the object comprises a picture.

14. The image reading device of claim 8, wherein the first is replaced with the second image.

15. An apparatus, comprising:
means for selectively moving a first picture or a second picture into a light oath of a scanner;
means for detecting a first image signal from the first picture and a second image signal from the second picture disposed in the light route;
means for determining at least one difference between the first picture and the second picture; and
means for initiating a scanning operation based at least in part on the at least one determined difference.

16. The apparatus of claim 15, wherein the means for determining at least one difference comprises:
means for determining one or more properties of the first picture and the second picture; and
means for identifying one or more differences between the determined properties.

17. The apparatus of claim 15, further comprising means for replacing the first picture with the second picture.

18. The apparatus of claim 15, wherein the means for detecting the second signal in response to conveying of the second image signal in response to conveying of the second picture into the light path.

19. The apparatus of claim 15 wherein the means for selectively moving the first picture or the second picture into the light path includes an image switching mechanism for changing a position of the first picture and changing a position of the second picture.

20. A method, comprising:
disposing a first image in a light route of a scanner;
detecting a first image signal of the first image;
forming a second image in the light route by at least partially distorting the first image;
detecting a second image signal of the second image disposed in the light route of the scanner; and
activating a scanning function to scan a scanning object in response to a detected difference between the first image signal and the second image signal.

* * * * *